United States Patent [19]

Triponez et al.

[11] Patent Number: 5,172,349
[45] Date of Patent: Dec. 15, 1992

[54] ELECTRONIC TIMEPIECE WITH ANALOG DISPLAY

[75] Inventors: André Triponez, Lamboing; Jean-Philippe Rebeaud, Cressier, both of Switzerland

[73] Assignee: ETA SA Fabriques d'Ebauches, Granges, Switzerland

[21] Appl. No.: 821,310

[22] Filed: Jan. 13, 1992

Related U.S. Application Data

[63] Continuation of Ser. No. 511,725, Apr. 20, 1990, abandoned.

[30] Foreign Application Priority Data

Apr. 21, 1989 [CH] Switzerland ............ 01535/89

[51] Int. Cl.⁵ .................................. G04B 5/00
[52] U.S. Cl. .......................... 368/157; 368/159; 368/88
[58] Field of Search ............... 368/159, 80, 228, 238, 368/229–240

[56] References Cited

U.S. PATENT DOCUMENTS

| | | | |
|---|---|---|---|
| 4,483,627 | 11/1984 | Muller et al. | 368/76 |
| 4,788,669 | 11/1988 | Kamiyama | 368/80 |
| 4,800,545 | 1/1989 | Wuthrich et al. | 368/190 |
| 4,969,133 | 11/1990 | Triponez | 368/80 |

FOREIGN PATENT DOCUMENTS

627044 12/1981 Switzerland .

Primary Examiner—Bernard Roskoski
Attorney, Agent, or Firm—Griffin Butler Whisenhunt & Kurtossy

[57] ABSTRACT

The timepiece of this invention comprises an electromagnetic motor (100) the stator (2) of which is flat and at least partially covered by a reinforcement plate (68) of non-magnetic material or, if need be, of very low magnetic permeability which has been attached to it, preferably by welding, prior to subjecting it in bulk along with others, to reheating thereby to protect it during such operation against the risk of deformation or breakage which would render it thereafter unusable. In conformity with the invention and to avoid such plate becoming a useless extra part taking up space in the timepiece, it includes means which enable it to form at the same time another element of the timepiece. Such element may be for instance a trigger piece jumper spring (72) which cooperates with a trigger piece (212) in order to define stable positions of a manual control stem (184) which may be axially displaced.

11 Claims, 4 Drawing Sheets

ELECTRONIC TIMEPIECE WITH ANALOG DISPLAY

This is a continuation of application Ser. No. 511,725, filed Apr. 20, 1990, now abandoned.

This invention concerns electronic timepieces having an analog display and in particular, but not exclusively, watches of this type.

BACKGROUND OF THE INVENTION

The majority of electronic watches with analog display which are presently in existence are watches in which the indicating organs are driven by a single electromagnetic motor of the bipolar monophase stepping type which is conceived to rotate normally only in one sense by steps of 180° in response to alternating polarity pulses.

At a certain epoch motors of this type comprised a rotor with a permanent magnet generally cylindrical in form and diametrally magnetized, a stator formed of two polar parts constituted by two distinct pieces situated in a single plane and which exhibited polar faces in the form of portions of a cylinder in order to surround the rotor and which were separated on either side of the latter by narrow slots, and a winding surrounding a core to which the pole pieces of the stator were fixed.

Furthermore the pole pieces of the stator were arranged in a manner such that their polar faces were slightly offset, in the contrary sense, relative to the axis of rotation of the rotor in order to create for such rotor two well-defined stable rest positions angularly separated by 180° and in which its magnetization axis formed an angle of approximately 45° with the axis which joined the slots of separation between such pieces.

These motors exhibited in fact serious disadvantages.

Effectively, in order to have them function in a sure manner with an optimum yield, it was necessary that the excentricity of the polar faces of their pole pieces be regulated with great precision.

To accomplish this, it was necessary initially to mount the motors on their supports, for instance base plates, which were provided with studs around which the pole pieces could pivot, next effect the regulation by means of excentrics with which they were provided and with the help of special tools, and finally fix these pole pieces on to the supports by means of screws. Such regulation thus took up a great deal of time. Furthermore, it was necessary to conceive watch movements in a manner such that one could see the parts of the pole pieces situated in the neighbourhood of the rotors and have access to the excentrics and to the blocking screws, thus rendering the bridges which permitted maintaining the rotors in place practically incapable of serving for other purposes. Finally, it happened that one was obliged to again effect the same operations of adjustment when it was necessary to disassemble the watches or when the latter had been subjected to shocks.

For this reason, such motors were used only during a very short period of time and have yielded place to those much easier to manufacture and to employ which are presently found in watches.

These present motors assume essentially three forms and are distinguished in fact from those which have just been discussed only in respect of their stators.

The simplest and by far the most current are those which possess a stator which is formed of a single piece cut out from a plate of soft magnetic material and which includes in its central portion a cavity bounded by an internal wall of essentially cylindrical form in which is coaxially placed a rotor. In these motors the polar parts are coupled between themselves by necks, i.e. narrow portions easily and rapidly saturable by the magnetic flux, which play practically the same role as the slots between the pole pieces of the previous motors and the excentricity of these pole pieces is replaced by notches or diametrally opposed flattened portions exhibited by the internal wall of the stator.

In the other two forms of bipolar monophase motors which one encounters in certain watches, but far more rarely, one again finds the idea of two distinct pole pieces.

In one case these pole pieces exhibit the same offset pole faces as those of the older motors mentioned hereinabove, but they are in this case coupled and welded between themselves on either side of the rotor by interposed elements of non-magnetic material, or practically in a manner to form a monoblock stator.

In the other case, these pole pieces continue to be separated by slots, but their polar faces in the form of portions of a cylinder are no longer offset and are provided with notches in order to define the rest positions of the rotor, and the motor includes in addition a cylindrical sleeve of non-magnetic material, fixed to a base plate on which the motor is mounted, which coaxially surrounds the rotor and which serves as a positioning and support element for the polar faces of the pole pieces.

Whatever be the manner in which they are obtained, these monophase bipolar motors have the advantage of being simple, occupying little volume and of low cost of manufacture, but they also show a serious defect.

When they are normally used in watches, i.e. when one is satisfied to have them turn in the sense for which they are designed and which permits advancement of the indicating means, for modifying the display information and above all for time setting, one is obliged to provide either mechanical arrangements which enable a correction of the time indication in both the advancing and retarding senses, or electronic arrangements which assure only a unidirectional correction. In the second case, the motor is, during a correction, driven by pulses of a fixed frequency or dependent from the speed of operation of a manual control element which is clearly greater than that of the pulses which it receives in the normal mode of operation. At the same time, in order that it may respond to each of the correction pulses, this frequency must remain sufficiently low, generally not exceeding 32 or 64 Hz, from whence the time taken to achieve correction may be quite long and not acceptable for watches having a seconds hand.

The oldest solutions which have effectively been put into practice and which have permitted to resolve this problem at least partially, are two in number.

The first consists of keeping the same bipolar monophase stepping motor and causing it to turn backwards as well by controlling it in a special fashion. Thus, one continues to benefit from the advantages of this type of motor, but the performances in the reversed direction are very mediocre relative to those obtained in the normal forward operation.

The second solution is to use a bidirectional motor such as that forming the object of U.S. Pat. No. 4,371,821 and which does not exhibit this difficulty.

This motor which also rotates by steps of 180° comprises the same rotor as a monophase motor, a stator in a single piece with three pole pieces connected among themselves by necks and which itself also presents an essentially cylindrical cavity for housing the rotor and notches in the internal wall surrounding such cavity in order to define two rest positions at 180° from one another for this rotor, and two windings surrounding two cores which couple mechanically and magnetically one of the pole pieces respectively to the other two. Such a motor is clearly of greater volume and of a higher cost of manufacture than a monophase motor.

These two solutions enable effecting electronically time setting and, for instance, far more rapid time zone changes in watches which comprise only minutes and hours hands, but unfortunately they are not yet sufficient to be applied to watches having a seconds hands and/or a date indicator.

This is one of the reasons for which there has begun some time ago the production of watches with two motors for driving the indicating organs or groups of indicating organs separately.

Another reason is the sparing of energy thereby achieved. This is the case in particular for a watch in which the two motors serve to drive on the one hand the seconds and minutes hands and on the other hand an hours hand and a date indicator, or for a watch in which the seconds, minutes and hours hands are driven by a first motor and a date disc by a second motor, but for which one has been obliged to forego time and date setting electronically.

A third reason is that one may thus easily increase the number of functions which the watch may fulfil, as for instance chronograph, alarm, etc.

Finally, a fourth reason is that it then becomes possible to reduce the number of parts in the wheel train of the watch.

Presently, to profit still further from all the advantages which the fact of not being limited to a single motor presents, one arrives at manufacturing watches which comprise four and even sometimes five thereof.

The difficulty is evidently that, for instance two motors cost twice as much and occupy twice as much volume in a watch as a single motor, or practically, if they are not completely identical.

This explains that one very quickly came to the idea of conceiving motors with a common stator for two rotors or even more.

This much said, at least since the epoch of the bipolar monophase motors discussed at the beginning, one generally has been used to manufacturing flat stators or the pole pieces which go to make them up in starting from a plate of soft magnetic material, in giving to them the desired form by simple or successive blanking, in placing them next in bulk into holders and in heating them thus in ovens in order to subject them to an annealing operation which enables realigning the crystals of the material of which they are formed, suppressing internal mechanical stresses etc.; otherwise said, restoring to this material the good magnetic properties which it had more or less lost by the deformation at the moment of the blanking operation.

Now this manner of operation gives rise to a problem. Effectively, flat stators or their pole pieces always have relatively fragile portions. This is the case in particular of the horns which the pole pieces must exhibit in order to be able more or less to surround a rotor, or the necks of single piece stators. Consequently, at the moment when these stators or these pole pieces are placed in bulk in the holders and emptied therefrom, or even simply when they are shifted during their transport, there are always certain which are deformed or break and which are no longer usable, this leading to an increase in the cost price of the motors which one forms with those which remain intact.

Furthermore, it is well evident that the more the stators and the number of fragile portions which they comprise become larger, the more the risks of deformations and breakage increase, and the greater the loss with each rejected piece, taking into account that their cost of manufacture and very often the investments necessary for their development are also ever greater.

Thus, for stators of motors having two rotors which one is beginning to provide this problem becomes important, above all if the arrangement is such that the rotors are very close to one another in order to reduce as far as possible the number of wheel sets of the watches provided with this type of motor.

To solve this problem, it is sufficient to recall a solution which has been found for eliminating the difficulties of regulation of monophase motors having a two-piece stator previously discussed, and which enabled at the same time to eliminate the problem for such motors.

This solution which formed the object of patent GB 1 457 676 and which has been employed during two or three years consisted initially of cutting out from a plate of soft magnetic material a piece with cavity, the interior and the exterior contours of which corresponded exactly to the form and the relative position of the pole pieces of the stator which one wished to obtain. This piece was then entirely welded on to a support plate of nonmagnetic material, the exterior contour of which corresponded in large measure to its own in order to permit the correct positioning thereof before the welding and which exhibited a round hole, the circumference of which circumscribed the wall of its cavity. After this one proceeded to a further blanking operation to obtain the slots which were to separate the two pole pieces and one heated the assembly in order to subject the stator to an annealing operation. Naturally, in order that the pole pieces during this annealing and at the moment of cooling down not be subject to stresses and deformations, and in order that they remain correctly positioned relative to one another, it was necessary to choose for the support plate a material which had the same coefficient of thermal expansion or almost the same as that of the stator.

Relative to what has previously been done, this support plate thus also had the effect of reinforcing the pole pieces of the stator and assuring a perfect protection of the latter.

Furthermore, it is entirely possible to join such a plate to any flat stator whatsoever in order that it play likewise this role therefor and often in limiting its extent in order that it cover only a zone in which are found the fragile portions of such stator.

At the same time, if one were satisfied to operate in this manner, one would encounter two other problems.

The first is that if it is true that the presence of reinforcing plates may effectively permit a considerable reduction in the cost price of large stators by eliminating practically entirely the risk of having rejects following the annealing and in spite of the cost of these plates and their attachment to such stators or the stators to them. this is much less the case for small dimension stators or the pole pieces thereof which are, even so, less fragile and the manufacture of which now is clearly less expensive. In this case providing reinforcing plates in order to avoid losing a certain percentage of units would no longer be very economical. It could even be at times entirely uneconomical and thus lose all interest.

The second problem is that such plates when thereafter found in watches or other timepieces, become elements which only increase the number of the watch components and take up space without having any further utility.

The purpose of this invention is to bring about a solution to these two problems.

SUMMARY OF THE INVENTION

This purpose is achieved thanks to the fact that, in a timepiece according to the invention which comprises in particular an electromagnetic motor with at least one permanent magnet rotor mounted to rotate around an axis, a basically flat stator including at least two pole parts which partially surround the rotor and which are arranged substantially perpendicular to its axis of rotation, and a winding magnetically coupled to such stator, indicator means for displaying time information, wheel sets for kinematically coupling such indicator means to the motor and which comprises effectively also a reinforcing plate for the stator of such motor which is attached from one side of this stator to these pole pieces and which covers them at least partially in closely surrounding said rotor, such reinforcing plate includes means which at the same time may constitute at least one other element of the timepiece.

This element may be purely mechanical as one will see hereinafter, or electromechanical, as for instance a blade of an electrical contact.

Thus, one may dispense with the manufacture and assembly of at least one other part of the timepiece thus effecting an additional economy when the latter is provided with a motor having a large stator, and the utilization of a reinforcing plate for stators of small dimensions becomes clearly advantageous.

The invention will be better understood following reading of the description of two possible embodiments thereof. This description makes reference to the enclosed drawings.

BRIEF DESCRIPTION OF THE DRAWINGS

FIG. 2 shows partially and from above a variant of the stator of FIG. 1;

DESCRIPTION OF THE PREFERRED EMBODIMENT

Figure 1:
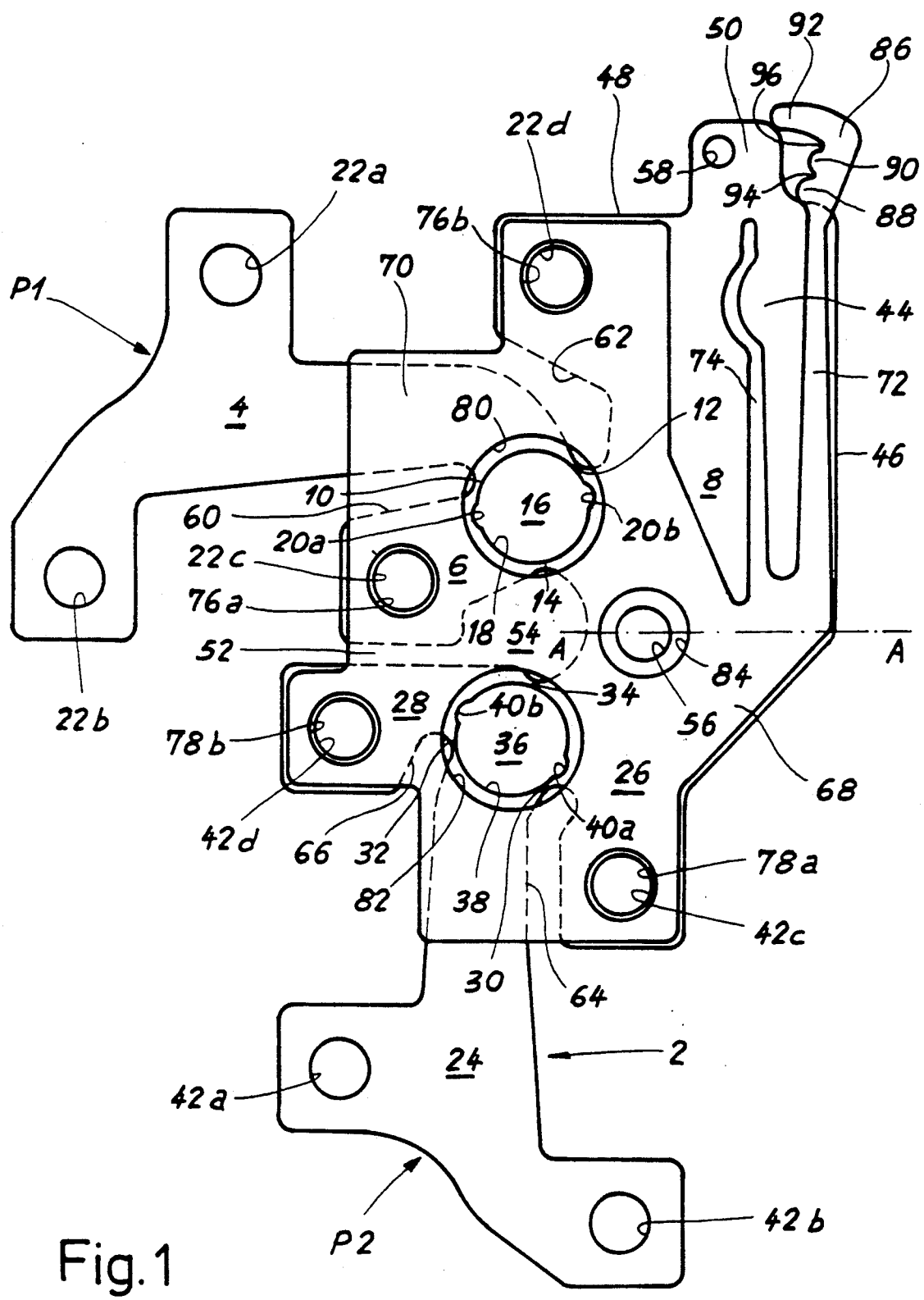
FIG. 1 is a top view of an example of a stator for a motor having two rotors covered by a reinforcing plate provided to form additionally a portion of the manual control arrangement of an electronic watch in which the motor in question: and such plate are incorporated.

The flat stator 2, for a motor having two rotors, which is shown on FIG. 1, is in a single piece formed for instance of a ferro-nickel alloy such as that which is sold under the trademark "VACOPERM" or the trademark "PERMIMPHY".

This stator may be considered as being formed from two parts P1 and P2, separated by the line A—A and arranged perpendicularly relative to one another which correspond each to the stator of a bidirectional motor such as that which forms the object of U.S. Pat. No. 4,371,821 previously cited.

The part P1 exhibits effectively three pole pieces 4, 6 and 8, which are joined among themselves by necks 10, 12 and 14, a cavity 16 which is surrounded by a substantially cylindrical internal wall 18 formed by such pole pieces and the necks and which is intended to receive a rotor having a bipolar permanent magnet, and two diametrally opposed notches 20a and 20b provided in the internal wall 18 in order to create two rest positions angularly separated by 180° for such rotor.

Additionally, this part P1 is shaped and pierced by four holes 22a, 22b, 22c and 22d in order to permit the fastening thereto, for instance by screws, of two cores, each surrounded by a winding, which will couple the pole piece 4 respectively, to the the pole pieces 6 and 8, in being situated on either side of pole piece 4 and substantially parallel to line A—A.

In the same manner, the part P2 of stator 2 comprises three pole pieces 24, 26 and 28 which correspond respectively to pieces 4, 6 and 8 of part P1 but which do not have at all the same form nor the same dimension except insofar as concerns piece 24 which differs only very little from piece 4.

One likewise finds in part P2 three necks 30, 32 and 34 which couple two by two the pole pieces 24, 26 and 28, a cavity 36 bounded by an essentially cylindrical internal wall 38 and having the same diameter as wall 18 of the part P1 for the housing of another rotor with a bipolar magnet, two diametrally opposed notches 40a and 40b in wall 38 and holes 42a, 42b, 42c and 42d for the attachment of two other cores surrounded by two other windings which will couple the pole piece 24 to the pole pieces 26 and 28 in being placed on either side of piece 24, but which will in this case be substantially perpendicular to line A—A.

Additionally, the configuration and arrangement of the parts P1 and P2 of the stator are such 1. that the two pole pieces which join along the line A—A are pieces 8 and 26;

2. that piece 8 is clearly bigger than the others in order that the stator have by virtue thereof a corner with approximately a right angle 44 and a straight side 46 which starts from line A—A and which is perpendicular thereto and another side 48 which exhibits a protuberance 50 close to the preceding;

3. that the cavities 16 and 36 are close to one another and have their centers situated on a straight line substantially perpendicular to line A—A; and 4. that the pole piece 28 be close to piece 6 and separated therefrom by a slot 52 having parallel edges which is oriented in the direction of the line A—A and which is extended towards the interior of the stator by a cavity 54 so as to permit forming the necks 14 and 34 by which the pole parts 6 and 28 are respectively coupled to the parts 8 and 26.

Additionally, stator 2 includes two other cylindrical holes 56 and 58, the utility of which will appear hereinafter. The first, 56, of these holes is situated close to the bottom of cavity 54 in a manner such that its axis be at an equal distance to those of the cavities 16 and 36 and the second, 58, which is smaller, is at the end of the protuberance 50.

In looking at FIG. 1, it is easy to note that because of the cavities 16 and 36 the slot 52, cavity 54 and the four more or less deep notches 60, 62, 64 and 66 which respectively separate the pole pieces 4 and 6, 4 and 8, 24 and 26 and 24 and 28, this stator normally exhibits an entire zone which is particularly fragile surrounding all these openings in which it may easily be bent or twisted mainly proximate the necks 10, 12, 14, 30, 32 and 34 where it may even reach the point of breaking when it is manipulated along with others without taking due care.

This confirms what has been previously said with respect to motors which comprise two closely located rotors and for which the presence of a reinforcing plate is particularly justified.

In the present case, this reinforcing plate which is designated by the reference 68 is formed of a main part 70, the role of which is effectively to prevent the stator 2 from deforming and breaking and which to this end has been applied and fastened rigidly to the latter, preferably by welding or eventually by gluing, and two tongues 72 and 74 attached to this main portion and which themselves have not been connected to the stator.

On the other hand, plate 68 has a thickness clearly less than that of stator 2, for instance approximately three times less thick and the material which forms it is not only a non-magnetic material, the thermal coefficient of expansion of which is equal to or closely equal to that of the stator material, but likewise a material sufficiently elastic in order that the tongues 72 and 74 are easily flexed. When the stator is effectively of "VACOPERM" or "PERMIMPHY", this material may advantageously be beryllium copper or steel sold under the trademark "PHYNOX" by the company IMPHY, which steel is an alloy of iron, cobalt, chromium, nickel and molybdenum.

To return to the main part 70, it may be seen that it covers almost entirely the pole parts 6, 26 and 28, the slot 52, the cavity 54 and the notches 60, 62, 64 and 66 and only partially the pole parts 4, 8 and 24 of which the zones the furthest separated from the cavities 16 and 36 are sufficiently massive and resistant to not require to be protected and that it is pierced with seven cylindrical holes 76a, 76b, 78a, 78b, 80, 82 and 84 respectively coaxial to the holes 22c, 22d, 42c and 42d, for the fastening of the cores to the windings, to the cavities 16 and 36 and to hole 56.

One may also see that the holes of the main part 70 are all larger than those of the stator with which they are aligned and that the difference in diameter increases when one goes from holes 76a, 76b, 78a and 78b to holes 80 and 82 and to hole 84.

As regards holes 80 and 82 and cavities 16 and 36, it is interesting to note that this difference in diameter is sufficiently substantial that the reinforcing plate 68 does not in fact cover the necks 10, 12 and 14 nor the necks 30, 32 and 34. This does not prevent the protection of the latter from being normally well assured, since the pole parts which they connect are totally immobilized relative to one another.

Finally, in corner 44 of the stator and on the portion left free by the main part 70 of plate 68 are found the two tongues 72 and 74 which extend almost parallel to the side 46 of this corner. The tongue 74 which is the furthest away from this side 46 arrives almost to the level of side 48 and has in its extension the protuberance 50. On the other hand, the tongue 72 which is very close to the side 46 terminates beyond side 48 and to the right of the protuberance 50 by an end 86 in the form of a crescent with two small rounded off projections 88 and 90 at the interior which form between themselves and with point 92 of the crescent two notches 94 and 96.

Slot 52 between stator pole pieces 6 and 28 is evidently provided to constitute between the latter a zone of high magnetic reluctance and to isolate thus the magnetic circuits of the two parts of the motor which correspond to parts P1 and P2 of the stator. Otherwise these two parts of the motor could not function separately and correctly even if one did not energize them at the same time but alternatively, such being of interest in the case of two independent motors in view of the matter of energy consumption.

The problem is that with this slot 52 the pole pieces 6 and 28 may occasionally not be found exactly in the same plane when one attaches the reinforcing plate onto the stator, so that such attachment may not be very good and may fail in this region, and there are then certain risks of deformation and rupture for the stator. To avoid this, one may do as is shown on FIG. 2, i.e. provide at the moment of forming the stator two necks 98a and 98b for mechanically coupling among themselves the pole parts 6 and 28. From the point of view of the operation of the two parts of the motor, this changes almost nothing.

Figure 3:
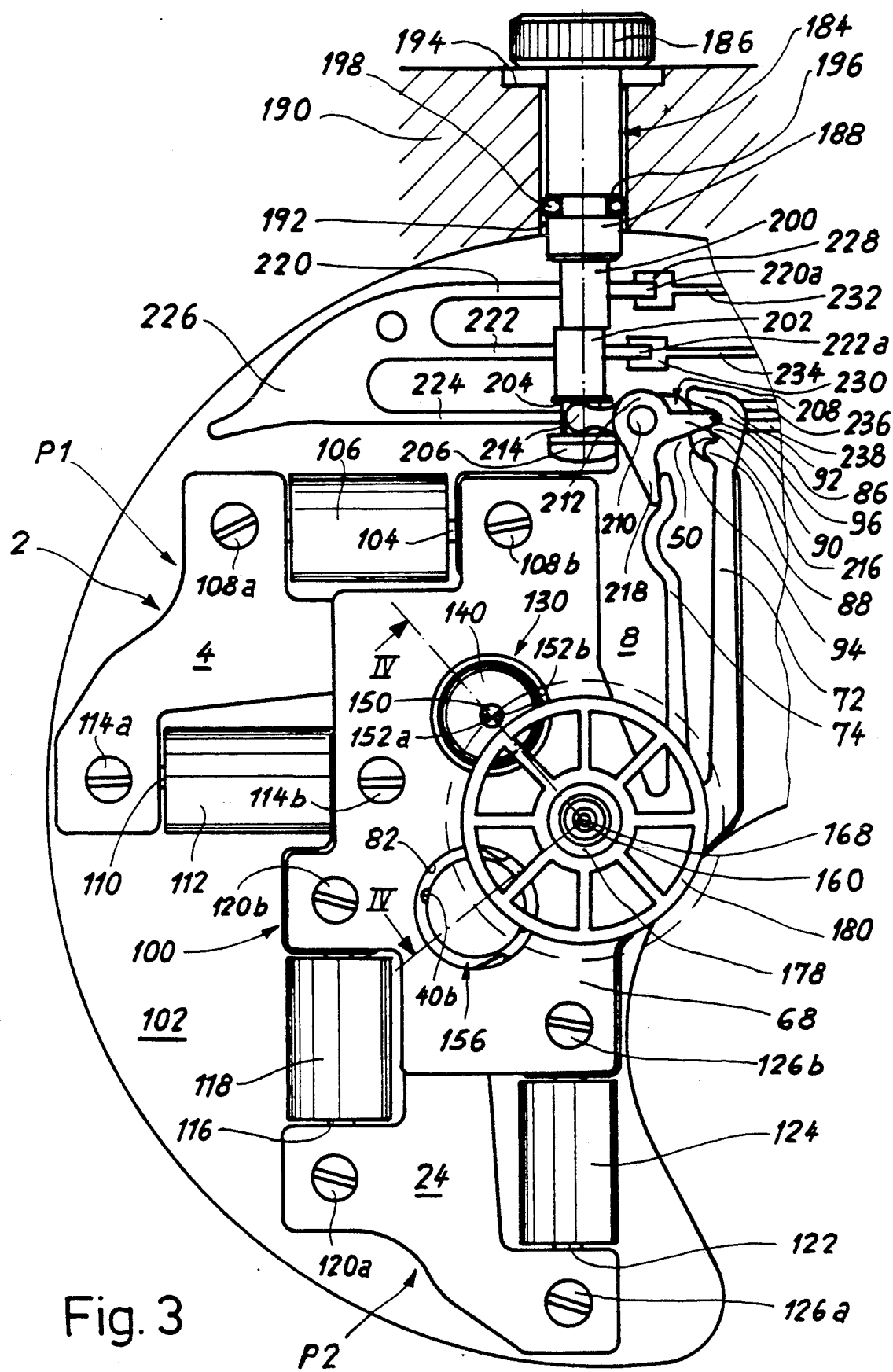
FIG. 3 is a view likewise from above of a portion of the watch just mentioned.

If one now looks at the part of the watch which is represented, seen from above, on FIG. 3, one will easily distinguish this motor designated by the reference 100 and mounted in an adequate manner on a printed circuit 102, with its stator 2 surmounted by the reinforcement plate 68 and the four cores 104, 110, 116 and 122 which are each surrounded by a winding respectively 106, 112, 118 and 124 and which couple the different pole parts of the two parts P1 and P2 of the stator in a manner such as has been already indicated, being attached thereto by pairs of screws, respectively 108a and 108b, 114a and 114b, 120a and 120b and 126a and 126b.

On the other hand, what one cannot see on this figure is the manner in which the two rotors are formed. In order to perceive this, it is necessary to refer to FIG. 4 which also shows the indicating means for the watch and the wheel sets through which the indicating means are driven by the two rotors.

Figure 4:
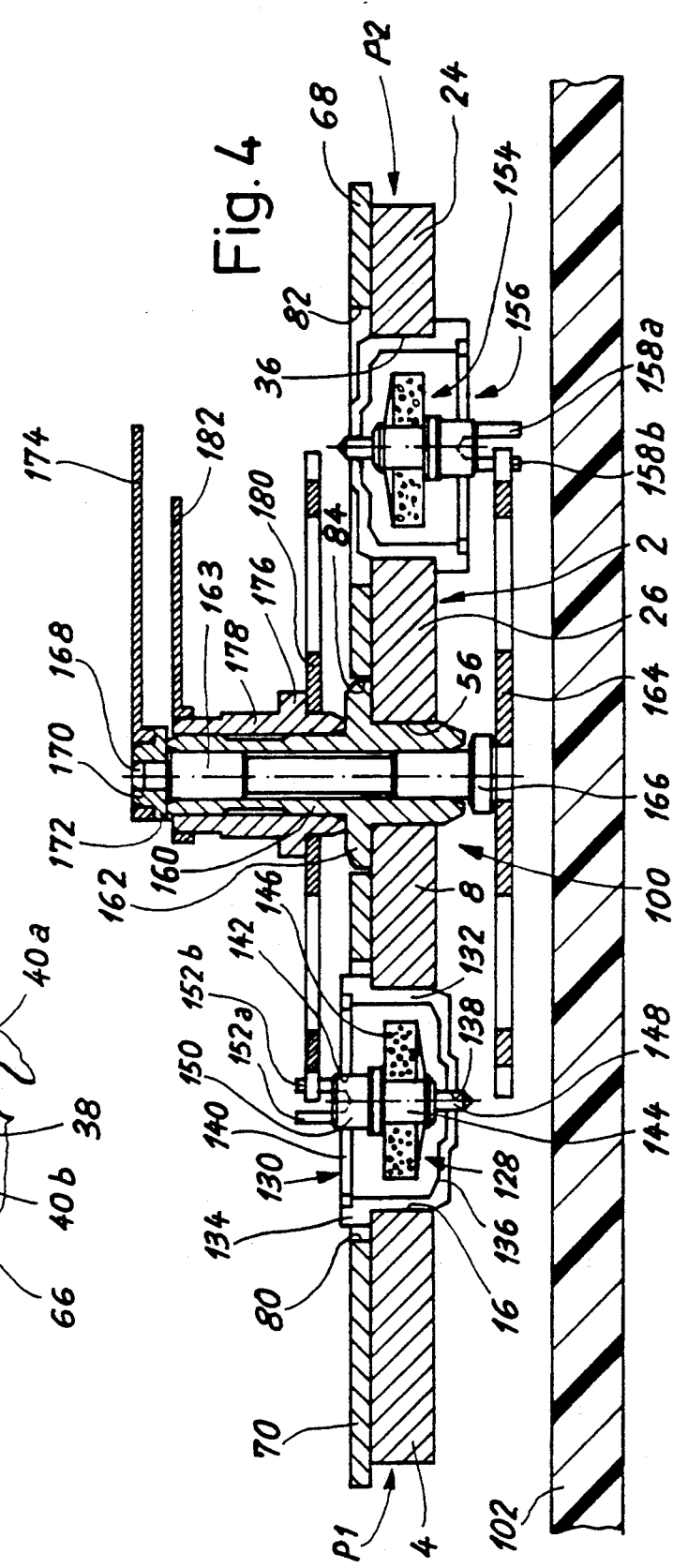
FIG. 4 is a partial cross-section at an enlarged scale along the broken line IV—IV of FIG. 3, to which have been added the indicating means for the watch.

If one considers initially the left part of this figure 4, it can be determined that rotor 128 of the part of motor 100 to which belongs pole piece 8 of stator 2 is enclosed in a small caisson 130. This caisson comprises a piece 132 in the form of a skirt of non-magnetic material, e.g. of beryllium copper which has been force driven into the cavity 16 of the stator and which is immobilized in translation by a flange 134 surrounded by the wall of the hole 80 of the reinforcing plate 68. The bottom 136 of the part 132 is pierced with a central hole in order to form a first bearing 138 for the rotor. Furthermore, the opening of this piece is blocked by a plate 140 which also exhibits a central hole in order to constitute a second bearing 142 for the rotor 128.

This rotor 128 comprises a shaft 144 on which is mounted a bipolar magnet 146 and one of the ends of which forms a pivot 148 which is engaged with bearing 138. The other end 150 of this shaft which is larger passes through bearing 142 and is extended by two studs 152a and 152b which play the role of output pinion.

It is clear that in thus assembling the rotor 128 initially in caisson 130 and in next fastening this latter on to the stator one avoids the delicate operation of centering this rotor relative to the stator during the overall assembly of the movement.

If one now observes the right part of the figure it will be noted that the second rotor 154 is identical to the first and mounted in exactly the same manner in another caisson 156 driven into the cavity 36 of the other part P2 of the stator, but in the opposite sense, this causing the studs 158a and 158b to be located on the side of the stator opposite to that which bears the reinforcing plate 68.

Continuing with the same FIG. 4 between the two rotors 128 and 154, there will be found the cylindrical hole 56 of the stator (see FIG. 1) in which is driven one of the ends of a center tube 160 which extends in front of stator 2 and which possesses a collar 162 housed in hole 84 of the reinforcing plate 68 which is supported against the front face of the stator.

Through this tube 160 passes a minutes axis 163 which bears at one end behind the stator a minutes wheel 164 which meshes with the studs 158a and 158b of rotor 154.

This axis 163 is held in place axially in tube 160 by a collar 166 which it exhibits just in front of wheel 164 and a stopping ring 170 with a flange 172 which is driven on to a ferrule 168 and to which is attached a minutes hand 174.

Finally, around the upper part of the center tube 160 is assembled an hours wheel pipe 176 with a tube 178 which is axially retained by collar 166 of the tube 160 and by the flange 172 of the ring 170 and which bears an hours hand 182 and an hours wheel 180 fixed to tube 178 which meshes with spurs 152a and 152b of the rotor 128.

Reference will now be had once again to FIG. 3 in order to describe the manual control arrangement which is provided in order to permit not only electronic time setting of the watch, but also to select and control at least one function other than that of indicating the normal time of day, this being readily fulfilled with the motor and the hands with which it is provided.

This arrangement comprises a rotatable and sliding stem 184, a system of positioning and return which is conceived in order that such stem may be axially displaced between a neutral or rest position which it normally occupies, a drawn-out stable position and a pushed-in unstable position, and a switching system that it may activate in order to provide electronic control and correction signals.

The control stem 184 includes initially a crown 186 so that it may be manipulated and a guide portion 188 which permits it to pass through the watch case 190, very partially and schematically represented on the drawing, in passing through a hole 192 which assures its guidance in translation and rotation and which furthermore defines its pushed-in position thanks to a support surface 194 which it exhibits on the side of the crown and up to which the latter may be pushed in to the interior of the case. In addition, as is usual, the guidance portion 188 is provided with an annular groove 196 for receiving a packing 198 between it and the case.

That much said, stem 184 also includes two cams 200 and 202 fastened side by side to one another and a groove 204 between the second cam 200 and a ferrule 206.

Cams 200 and 202 are similar to those which make up a part of the control arrangement for an electronic watch which forms the object of U.S. Pat. No. 4,379,642, i.e. they exhibit a substantially elliptic form, the axis of the stem passes through their centers and their major axes form between them an angle of around 45°.

On the other hand, stem 184 is arranged in a manner such that its ferrule 206 and the groove 204 are very close to the protuberance 50 of the stator of motor 100 on the side opposite to that of the end 86 of tongue 72 and in a manner such that the bottom of this groove 204 is at the same time tangent or almost to the plane in which is located the front face of the stator and behind the latter.

The positioning and return system of the stem comprises a trigger piece 208 and the two elastic tongues 72 and 74 of the reinforcing plate 68.

The trigger piece 208 is formed by a planar part which may pivot around a fixed axis 210 which passes through the hole 58 of the protuberance 50 of the stator and which is retained by this axis so as to remain always in contact or almost so with the stator in order to be able to cooperate with the tongues 72 and 74 and the groove 204 of the stem.

For the same reason, this trigger piece includes an annular central portion 212 which surrounds the axis 210 and from which emerge three branches 214, 216 and 218. The first of these branches, 214, is engaged in the groove 204 and shaped in order to transform a translation movement of the stem into a rotation movement of the trigger piece whilst permitting such stem always to be able to rotate freely. The second branch 216 which is roughly situated in the extension of the first has an almost triangular form and a rounded-off end which is permanently in contact with the interior edge of the end 86 of tongue 72 and which may be lodged in one or the other of these two notches. As to the third branch 218, this has a form resembling that of the second and it is arranged in a manner such that the edge of its central part may or may not contact the end of the tongue 74 from the side of the main part 70 of the reinforcing plate 68.

When the control stem 184 is in the neutral position, the edge of this third branch 218 of the trigger piece is simply in contact with that of the tongue 74 which is then in a rest position and the end of the second branch 216 is engaged in the notch 96 of the tongue 72 which also is in the rest position.

Let us suppose that the stem is effectively located in this neutral position and that one draws it out. As long as the pulling force which one exerts is not sufficiently great to cause the point of branch 216 to cross over the projection 90 and tongue 72 to flex, trigger piece 208 does not rotate and such point remains in notch 96, or returns thereto if it has reached a slight separation, when one releases the stem. On the other hand, if the traction force is greater than a certain value, the trigger piece turns in the clockwise sense and the point of its branch 216 comes to be located in the other notch 94 of tongue 72 while its branch 218 is separated from tongue 74.

If, after having succeeded in thus bringing the stem to its drawn-out position, one continues to pull on it with a normal force, the projection 88 of tongue 72 which is much more prominent than the other projection 90 prevents the point of branch 216 from coming out of notch 94, such projection 88 having furthermore a form adapted to this purpose.

In the same manner, to return the stem to the neutral position, it is necessary to exert on crown 186 a pressure sufficient to cause trigger piece 208 to turn in the counter clockwise sense and to cause the point of branch 216 to return into notch 96.

Tongue 72 thus constitutes a jumper spring for the trigger piece which assures a latching in position of the trigger piece and the stem when this latter is in neutral position and in the drawn-out position.

Suppose now that one presses on the crown 186 in order to cause the stem to pass from its neutral position to its pushed-in position. The trigger piece 208 is then forced to turn in the counter clockwise sense, which causes its branch 218 to bear on tongue 74 and to force it to flex while the point of its other branch 216 comes out of and is separated from notch 96 of tongue 72 from the side of its point 92 and also imposes a light flexing on the latter.

When one next releases the stem, the tongue 74 relaxes and very quickly returns to its rest position, this forcing the trigger piece to turn in the opposite sense and to bring the stem into the neutral position. During this time tongue 72 also returns to its rest position and acts in the same sense as tongue 74 on the trigger piece in tending to bring back automatically the point of its branch 216 into notch 96, but its action is far less effective and does not alone suffice to assure a rapid return of the stem into the neutral position.

One may thus consider that the tongue 74 alone constitutes a return spring for the trigger piece 208.

Finally, in order to conclude with the manual control arrangement, there remains to be discussed its switching system.

This switching system comprises three electrically conductive elastic contact blades 220, 222 and 224 which are substantially parallel to one another and arranged perpendicularly to the axis of the control stem and which form only a single piece with a base 226 thanks to which they are fastened onto a printed circuit 102 which is coupled for instance to the positive terminal of the source of feed voltage for the watch.

The first two blades 220 and 222 pass respectively under cams 200 and 202 in a manner that the latter may act on them when one turns the stem 184 whereby their free ends 220a and 222a are then alternatively brought into contact and separated from two corresponding fixed contact surfaces 228 and 230 provided on the printed circuit 102 which are coupled by conductive tracks 232 and 234 to the integrated circuit (not shown) of the watch and via the latter to the negative terminal of the voltage source of the watch.

As has been explained in detail in U.S. Pat. No. 4,379,642 an assembly such as that which is formed by the two cams 200 and 202, blades 220 and 222 and the surfaces 228 and 230 enables producing in response to a rotation of the stem two trains of pulses phase shifted relative to one another by 45°, the direction of such phase shifting depending on the sense of rotation of the stem and the frequency of the pulses of each train being proportional to its speed of rotation.

The third contact blade 224 also passes under the stem and is engaged in the groove 204 of the latter.

When the stem is in the neutral position, its free end, which is not visible on the figure, is located between two other contact surfaces which also are not visible on the figure and which are coupled to the integrated circuit of the watch by two conductive tracks 236 and 238. On the other hand when one brings the stem into the drawn-out position or into the pushed-in position, the free end of this blade 224 comes into contact with the one or the other of these two other surfaces.

With a control arrangement such as that which has just been described, one may for instance effect time setting and proceed with a change of the time zone in the forward or backward sense by bringing the stem into the drawn-out position and turning it in one or the other senses slowly for the first case, and rapidly for the second, and control an alarm function in employing the rotation of the stem and its drawn-out and pushed-in positions, or control a chronograph function in acting on the stem as on a push-button.

Should there be a chronograph function and for the measurement of short time intervals, the motor would be controlled in a manner such that the minutes hand 174 is transformed into a seconds hand and the hours hand 182 into a minutes hand.

Figure 5:
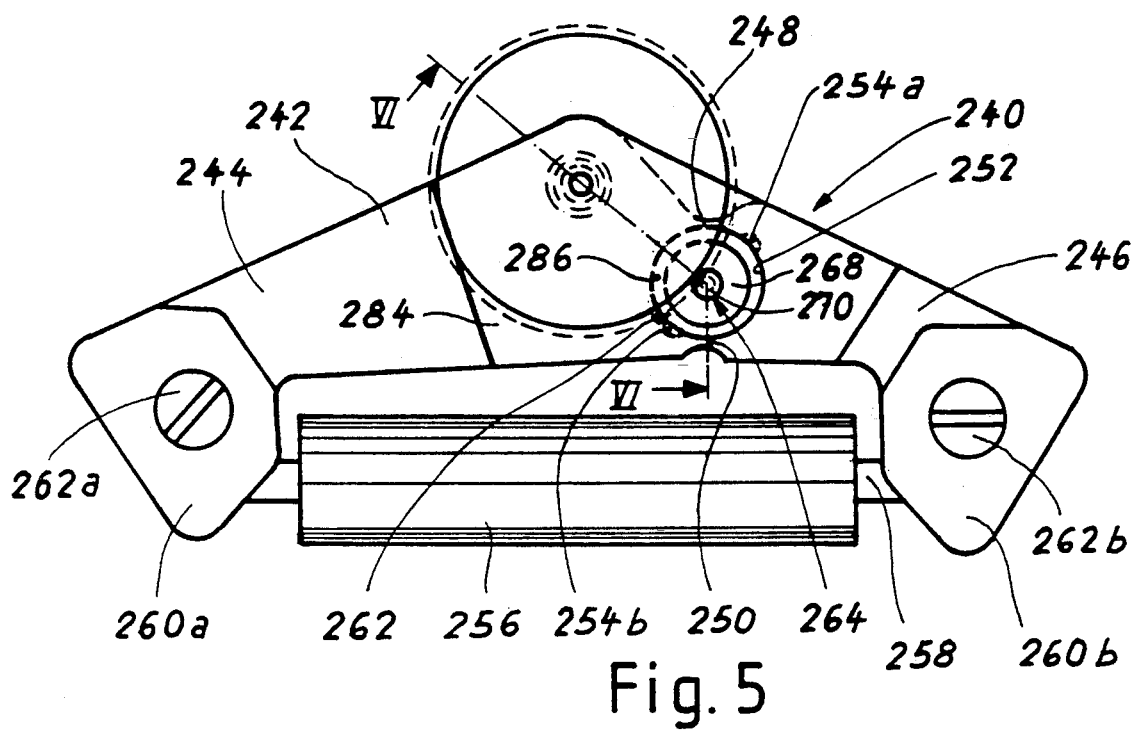
FIG. 5 is a top view of a portion of another watch which comprises a bipolar monophase motor covered with a reinforcing plate provided in order to form additionally a bridge.
Figure 6:
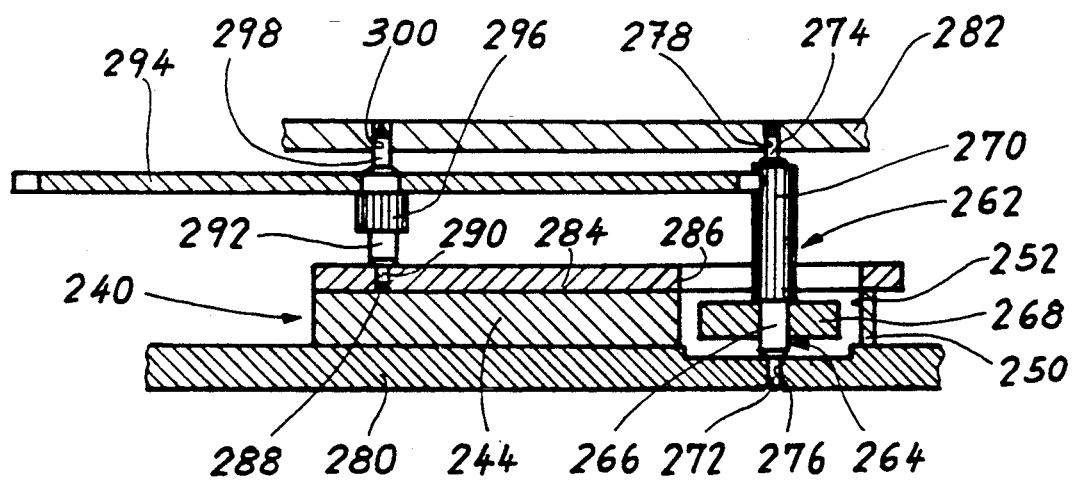
FIG. 6 is a partial cross-section along the broken line VI—VI of FIG. 5 which shows additionally other elements of this watch.

The part of the watch which is shown on FIGS. 5 and 6 is limited to those elements only which are necessary to illustrate a second possible embodiment of the invention.

This part of the watch comprises initially a monophase bipolar stepping motor 240 with a stator 242 in one piece like those that have already been spoken of.

The stator 242 has the general form of a V and naturally includes two pole pieces 244 and 246 which are connected to one another by two necks 248 and 250 which form with the latter an essentially cylindrical cavity 252 surrounded by an internal wall provided with two diametrally opposed notches 254a and 254b, and here situated in one of the branches of the V.

The motor 240 also comprises a winding 256 mounted on a core 258 with two ears 260a and 260b which are fastened by screws 262a and 262b to the free ends of the pole pieces 244 and 246 of the stator, and a rotor 262 partially housed in the cavity 252.

As is better seen on FIG. 6, rotor 262 possesses an axis 264 which exhibits a cylindrical portion 266 at the level of which it bears a cylindrical bipolar permanent magnet 268 coaxially arranged at the interior of the cavity 252, a toothed portion 270 above the preceding and longer than the latter in order to form a rotor pinion and at its ends two pivots 272 and 274 which are respectively engaged in bearings 276 and 278 of a base plate 280 which supports the motor and a bridge 282.

On the stator 242 is evidently fastened there again preferably by welding, a reinforcing plate 284.

As shown on FIG. 5, this plate 284 has a form and a cylindrical hole 286 coaxial to the cavity 252 and of the same diameter as the latter which permits it to cover the stator entirely including the necks 248 and 250 with the exception of the two respective portions of the pole pieces 244 and 246 which are the furthest separated from this cavity.

Finally, if one considers FIGS. 5 and 6 at the same time, one may determine that the plate 284 in question is additionally pierced close to the summit of the V which forms the stator, with a hole 288 which serves as bearing for one of the pivots 290 of the axis 292 which bears an intermediate wheel 294 meshing with the rotor pinion 270, and an intermediate pinion 296. The other pivot 298 of axis 292 is engaged in another bearing 300 of the bridge 282. This plate 284 thus constitutes a bridge for the intermediate wheel set 292, 294, 296 and one may readily imagine that it exhibits at least one other hole for the pivot of the axis of another wheel which would be driven by the pinion 296.

It is to be noted that, in the present embodiment, the non-magnetic material which composes it no longer need be elastic. It is sufficient that it is resistant to wear.

This said, the invention is, as may well be understood, not limited to the embodiments which have just been described.

For instance, rather than utilizing a reinforcing plate of non-magnetic material, one could occasionally, if need be, make do with a plate of material of very low magnetic permeability.

One could also fasten the plate to the stator not by welding or gluing but by riveting or screwing, but this evidently will cost more.

In other embodiments. this plate could also readily constitute, for instance, a calendar spring or, as has already been given to understand, a battery clamp, one or several elastic blades for producing control signals such as those which formed part of the watch of FIG. 3, or further a contact blade for grounding purposes.

Additionally, the invention could also apply very well to watches or other timepieces provided with any type of motor having a flat stator in several pieces. In such case the reinforcement plate could be designed so as to serve initially as a support and to permit fastening thereto the different parts of the stator in correctly positioning them relative to one another in the manner of the plate as discussed in patent GB 1 457 676.

Furthermore, for motors with large stators which could have for instance widely separated rotors, one could provide rather than a single reinforcing plate, several thereof in preferably arranging them so that each of them could fulfil another function.

What we claim is:

1. An electronic timepiece with analog display comprising an electromagnetic motor with at least one permanent magnet rotor mounted to rotate around an axis, a basically flat stator including at least two pole parts which partially surround the rotor and which are arranged substantially perpendicular to its axis of rotation and a winding magnetically coupled to said stator, indicator means for displaying time information, wheel sets for kinematically coupling said indicator means to the motor and a reinforcing plate for the stator of said motor which is attached from one side of said stator to said pole parts and which covers them at least partially, in closely surrounding said rotor, said reinforcing plate including at least one flexible portion cooperating with a control means for controlling said timepiece.

2. A timepiece as set forth in claim 1 wherein said control means comprises a manual control stem axially displaceable between a first and a second stable position so as to enable modification of time information displayed by said time indicator means and a trigger piece linked with said control stem, said reinforcing plate includes a main portion rigidly coupled to said pole parts of the stator, and said flexible portion comprises a first flexible tongue united with said main portion and left free to undergo displacement relative to the stator, said tongue comprising a trigger piece jumper spring which cooperates with said trigger piece so as to define said stable positions of said control stem.

3. A timepiece as set forth in claim 2 in which said stem may also be axially displaced between said first stable position and a third unstable position, wherein said reinforcing plate further includes a second flexible tongue united with said main portion and left free to undergo displacement relative to said stator, said second flexible tongue constituting a return spring which acts on said trigger piece in a manner to return automatically said stem to said first stable position when it is released after having been brought into said third position.

4. A timepiece as set forth in claim 3 wherein said first, second and third positions of the stem are respectively a rest position, a drawn-out position and pushed-in position.

5. A timepiece as set forth in claim 3 wherein said trigger piece is formed by a planar part which can pivot around a fixed axis integral with one of the pole parts of said stator and substantially perpendicular thereto, said planar part and said tongues being located substantially in the same plane and wherein said trigger piece comprises a central portion to which are joined a first branch engaged in a groove of said control stem, a second branch exhibiting a point permanently in contact with the edge of the end of the first tongue and which may be brought to be lodged alternatively in two notches in such end of the first tongue in crossing over a projection which separates them and at that time forcing such first tongue to flex, and a third branch with an end the edge of which is only in contact with that of the second tongue when said stem is in its first stable position and which forces said second tongue to flex when said stem is brought into its third position.

6. A timepiece as set forth in claim 1 wherein said motor comprises two permanent magnet rotors mounted for rotation around two substantially parallel axes, a single piece stator including three first pole parts connected to one another by necks to form a first recess in which is placed a first of such rotors, three second pole parts which are likewise connected together by necks to form a second recess in which the second rotor is placed, two first windings borne by two respective cores which couple one of said first pole parts of the stator to the other two so as to enable bringing about rotation of the first rotor, two second windings borne by two other respective cores which couple one of said second pole parts to the two others, so as to enable bringing about rotation of the second rotor and wherein said reinforcing plate covers at least partially each of said first and second pole parts and includes two holes for closely surrounding each of said rotors.

7. A timepiece as set forth in claim 6 wherein said stator pole pieces are shaped and arranged in a manner such that one of the first thereof is separated from one of the second thereof only by a slot and that said reinforcing plate covers almost entirely such two pole pieces and such slot.

8. A timepiece as set forth in claim 1 wherein the stator of said motor is in a single piece and wherein said pole parts are connected to one another by necks so as to form a recess in which said rotor is placed.

9. A timepiece as set forth in claim 1 wherein said reinforcement plate is of non-magnetic material.

10. An electronic timepiece with analog display comprising an electromagnetic motor with at least one permanent magnet rotor mounted to rotate around an axis, a basically flat stator including at least two pole parts which partially surround the rotor and which are arranged substantially perpendicular to its axis of rotation and a winding magnetically coupled to said stator, indicator means for displaying time information, wheel sets for kinematically coupling said indicator means to the motor and a reinforcing plate for the stator of said motor which is attached from one side of said stator to said pole parts and which covers them at least partially, in closely surrounding said rotor, said reinforcing plate comprising a main portion rigidly fastened to said pole parts of the stator and at least one flexible portion which may undergo displacement relative to the stator to accomplish another function of said timepiece.

11. An electronic timepiece with analog display comprising an electromagnetic motor with at least one permanent magnet rotor mounted to rotate around an axis, a basically flat stator including at least two pole parts which partially surround the rotor and which are arranged substantially perpendicular to its axis of rotation and a winding magnetically coupled to said stator, indicator means for displaying time information, wheel sets for kinematically coupling said indicator means to the motor and a reinforcing plate for the stator of said motor which is attached from one side of said stator to said pole parts and which covers them at least partially, in closely surrounding said rotor, said timepiece including at least a further element and said reinforcing plate comprising a main portion rigidly fastened to said pole parts of said stator and at least one flexible portion extending therefrom and engaging said further element whereby said main portion of said reinforcing plate performs a first function of reinforcing the stator and said flexible potion engages with said further element to perform a second function.

* * * * *